United States Patent
Hupka et al.

(10) Patent No.: US 10,526,463 B2
(45) Date of Patent: Jan. 7, 2020

(54) FOAM MATERIALS RESISTANT TO HIGH TEMPERATURES

(71) Applicants: Covestro Deutschland AG, Leverkusen (DE); BASF SE, Ludwigshafen (DE)

(72) Inventors: Florian Hupka, Düsseldorf (DE); Wolfgang Friedrichs, Köln (DE); Torsten Hagen, Essen (DE); Meike Niesten, Köln (DE); Roland Krämer, Mannheim (DE); Sindhu Menon, Osnabrück (DE)

(73) Assignees: Covestro Deutschland AG, Leverkusen (DE); BASF SE, Ludwigshafen (DE)

( * ) Notice: Subject to any disclaimer, the term of this patent is extended or adjusted under 35 U.S.C. 154(b) by 152 days.

(21) Appl. No.: 15/551,748

(22) PCT Filed: Feb. 17, 2016

(86) PCT No.: PCT/EP2016/053378
§ 371 (c)(1),
(2) Date: Aug. 17, 2017

(87) PCT Pub. No.: WO2016/131878
PCT Pub. Date: Aug. 25, 2016

(65) Prior Publication Data
US 2018/0312655 A1    Nov. 1, 2018

(30) Foreign Application Priority Data

Feb. 20, 2015  (EP) .................................. 15155919.2

(51) Int. Cl.
*C08J 9/14*      (2006.01)
*C08J 9/00*      (2006.01)
*B32B 15/04*     (2006.01)
*B32B 15/18*     (2006.01)
*B32B 15/20*     (2006.01)
*B32B 27/06*     (2006.01)
*B32B 27/36*     (2006.01)

(52) U.S. Cl.
CPC ............ *C08J 9/149* (2013.01); *B32B 15/046* (2013.01); *B32B 15/18* (2013.01); *B32B 15/20* (2013.01); *B32B 27/065* (2013.01); *B32B 27/36* (2013.01); *C08J 9/0038* (2013.01); B32B 2266/0214 (2013.01); C08J 2207/02 (2013.01); C08J 2375/08 (2013.01)

(58) Field of Classification Search
CPC ........... C08J 2203/142; C08J 2203/204; C08J 2205/10; C08J 2375/00; C08J 9/00; C08J 9/02; C08J 9/12; C08J 9/142; C08J 9/146; B32B 27/065; C08G 18/003; C08G 18/092; C08G 18/58
See application file for complete search history.

(56) References Cited

U.S. PATENT DOCUMENTS

| | | |
|---|---|---|
| 3,001,973 A | 9/1961 | Piepenbrink et al. |
| 3,120,502 A | 2/1964 | Merten |
| 3,124,605 A | 3/1964 | Wagner |
| 3,152,162 A | 10/1964 | Fischer et al. |
| 3,201,372 A | 8/1965 | Wagner |
| 3,242,108 A | 3/1966 | McGary, Jr. et al. |
| 3,277,138 A | 10/1966 | Holtschmidt et al. |
| 3,277,173 A | 10/1966 | Powers et al. |
| 3,362,979 A | 1/1968 | Bentley |
| 3,394,164 A | 7/1968 | McClellan et al. |
| 3,401,190 A | 9/1968 | Schmitt et al. |
| 3,454,606 A | 7/1969 | Brotherton et al. |
| 3,455,883 A | 7/1969 | Kamal et al. |
| 3,492,330 A | 1/1970 | Trecker et al. |
| 3,517,039 A | 6/1970 | Wagner et al. |
| 3,567,763 A | 3/1971 | Emmons et al. |
| 3,644,457 A | 2/1972 | König et al. |
| 3,654,106 A | 4/1972 | Wagner et al. |
| 3,673,128 A | 6/1972 | Hayash, Jr. et al. |
| 3,793,236 A | 2/1974 | Ashida et al. |
| 3,849,349 A | 11/1974 | Frisch et al. |
| 4,129,695 A * | 12/1978 | Bonin .................. C08G 18/003 521/108 |
| 4,699,931 A | 10/1987 | Fuzesi et al. |
| 4,766,158 A | 8/1988 | Fuzesi et al. |
| 4,788,224 A | 11/1988 | Müller et al. |
| 5,021,536 A | 6/1991 | Müller et al. |
| 5,162,387 A | 11/1992 | Abel et al. |
| 9,481,776 B2 * | 11/2016 | Wegener ............... C08G 18/003 |
| 2014/0093721 A1 | 4/2014 | Wegener et al. |

FOREIGN PATENT DOCUMENTS

| | | |
|---|---|---|
| CA | 2028678 A1 | 5/1991 |
| DE | 1072385 B | 12/1959 |
| DE | 1202785 B | 10/1965 |
| DE | 1230778 B | 12/1966 |

(Continued)

OTHER PUBLICATIONS

International Search Report for PCT/EP2016/053371 dated Mar. 23, 2016.
International Search Report for PCT/EP2016/053378 dated Mar. 31, 2016.
International Search Report for PCT/EP2016/053381 dated Apr. 7, 2016.
Written Opinion of the International Searching Authority for PCT/EP2016/053371 dated Mar. 23, 2016.

(Continued)

*Primary Examiner* — Sanza L. McClendon
(74) *Attorney, Agent, or Firm* — Oblon, McClelland, Maier & Neustadt, L.L.P.

(57) ABSTRACT

The invention relates to foam materials that are resistant to high temperatures, to the production of same from aromatic polyisocyanates and polyepoxides, and to the use of said foam materials.

13 Claims, No Drawings

(56) References Cited

FOREIGN PATENT DOCUMENTS

| | | |
|---|---|---|
| DE | 1915766 A1 | 11/1969 |
| DE | 2551631 A1 | 5/1976 |
| DE | 3713771 A1 | 10/1987 |
| DE | 3824685 A1 | 2/1989 |
| DE | 3938062 A1 | 5/1991 |
| DE | 4104199 A1 | 8/1992 |
| EP | 0272563 A2 | 6/1988 |
| EP | 0331996 A1 | 9/1989 |
| GB | 772830 A | 4/1957 |
| GB | 816923 A | 7/1959 |
| GB | 848671 A | 9/1960 |
| GB | 874430 A | 8/1961 |
| GB | 994890 A | 6/1965 |
| GB | 1017612 A | 1/1966 |
| GB | 1024288 A | 3/1966 |
| GB | 1502907 A | 3/1978 |
| WO | WO-2004085509 A1 | 10/2004 |
| WO | WO-2007132463 A1 | 11/2007 |
| WO | WO-201280185 A1 | 6/2012 |
| WO | WO-2012150201 A2 | 11/2012 |

OTHER PUBLICATIONS

Written Opinion of the International Searching Authority for PCT/EP2016/053378 dated Mar. 31, 2016.
Written Opinion of the International Searching Authority for PCT/EP2016/053381 dated Apr. 7, 2016.

\* cited by examiner

FOAM MATERIALS RESISTANT TO HIGH TEMPERATURES

CROSS-REFERENCE TO RELATED APPLICATIONS

This application is a national stage application (under 35 U.S.C. § 371) of PCT/EP2016/053378, filed Feb. 17, 2016, which claims benefit of European Application No. 15155919.2, filed Feb. 20, 2015, both of which are incorporated herein by reference in their entirety.

The present invention relates to high-temperature resistant foams and the preparation thereof by reacting reaction mixtures (=A state) of organic polyisocyanates and organic polyepoxides by the addition of blowing agents and a catalyst accelerating the epoxide/isocyanate reaction (hereinafter referred to as "EPIC reaction") into the final foamed C state, which is no longer meltable (hereinafter referred to as "EPIC foam"), and to the use thereof.

In early studies, U.S. Pat. Nos. 3,793,236, 4,129,695 and 3,242,108 describe the preparation of foams from polyisocyanates and polyepoxides. In part, like in U.S. Pat. No. 3,849,349, the addition of further H-active substances is described. The blowing agents known in polyurethane chemistry are listed as possible blowing agents, and CFCs are preferably used in the Examples.

DE 2 551 631 describes the preparation of polymers from polyisocyanates and polyepoxides, which have an alternating structure. Since a catalyst that promotes the carbodiimide formation is added, the polymers contain high proportions of carbodiimide structures (>10% by weight), and a controlled management of the trimerization and carbodiimide formation reactions proceeding in parallel is not possible. However, a high carbodiimide proportion in EPIC foams has a disadvantageous effect in view of the compressive strength and lambda values, and therefore is undesirable.

The more recent prior art describes the preferred preparation of such foams from reaction mixtures of organic polyisocyanates and organic polyepoxides via an intermediate containing partially trimerized isocyanurate groups (=intermediate or B state), which is stabilized by means of stoppers. In this case, the high-temperature resistant foams are obtained by reacting reaction mixtures of organic polyisocyanates, organic polyepoxides, catalysts and stoppers to form a storage-stable higher viscosity intermediate ("pretrimerization"), and reacting this higher viscosity intermediate by the addition of blowing agents and a catalyst spontaneously accelerating the isocyanate/epoxide reaction into the final foamed end state, which is no longer meltable (EPIC foam).

The preparation of storage-stable isocyanate/epoxide mixtures with the addition of an inhibitor having an alkylating effect as a stopper is at first described in EP 0 331 996 and EP 0 272 563. The preparation of an EPIC foam from an intermediate admixed with sulfonic acid alkyl esters having an alkylating effect as stoppers is disclosed in DE 39 38 062 A1.

According to WO 2012/80185 A1 and WO 2012/150201 A1, the quality of the thus prepared foams can be critically improved if certain blowing agents are used for the preparation of the EPIC foams.

One drawback of these high-temperature resistant foams, especially those prepared by the two-stage process, is an unsatisfactory conversion rate of the isocyanate (NCO) groups. However, free (unreacted) isocyanate groups in the foam (so-called "residual NCO") can lead to undesirable ageing processes, such as adhesion problems and deterioration of mechanical properties, e.g., embrittlement.

Therefore, it has been the object of the present invention to provide high-temperature resistant EPIC foams with low residual NCO values.

The object of the invention was achieved by a foam obtainable by a process in which a) an aromatic polyisocyanate is mixed with b) at least one aromatic compound having at least two epoxy groups, c) at least one catalyst accelerating the isocyanate/epoxide reaction, f) chemical and/or physical blowing agents, and e) auxiliary agents and/or additives, to form a reaction mixture, wherein the equivalent ratio of isocyanate groups to epoxy groups is from 1.2:1 to 500:1, and the reaction mixture is reacted into a foam, characterized in that said auxiliary agents and/or additives e) include at least one e1) phosphate liquid at 60° C. and under 1 bar, and said chemical and/or physical blowing agents f) include at least one carboxylic acid selected from formic acid and acetic acid, or that said blowing agent f) consists of water and optionally one or more compounds selected from the group containing hydrocarbons, fluorocarbons, and fluorohydrocarbons.

More preferably, the reaction is effected in the presence of d) a stabilizer selected from the group consisting of organic sulfonic acid esters, methyl iodide, dimethyl sulfate, benzenesulfonic acid anhydride, benzenesulfonic acid chloride, benzenesulfonic acid, trimethylsilyltrifluoromethane sulfonate, the reaction product of benzenesulfonic acid with epoxides, and mixtures thereof.

The invention also relates to a process in which a) an aromatic polyisocyanate is mixed with b) at least one aromatic compound having at least two epoxy groups, c) at least one catalyst accelerating the isocyanate/epoxide reaction, f) chemical and/or physical blowing agents, and e) auxiliary agents and/or additives, to form a reaction mixture, wherein the equivalent ratio of isocyanate groups to epoxy groups is from 1.2:1 to 500:1, and the reaction mixture is reacted into a foam, characterized in that said auxiliary agents and/or additives e) include at least one e1) phosphate liquid at 60° C. and under 1 bar, and said chemical and/or physical blowing agents f) include at least one carboxylic acid selected from formic acid and acetic acid, or that said blowing agent f) consists of water and optionally one or more compounds selected from the group containing hydrocarbons, fluorocarbons, and fluorohydrocarbons.

More preferably, the reaction is effected in the presence of d) a stabilizer selected from the group consisting of organic sulfonic acid esters, methyl iodide, dimethyl sulfate, benzenesulfonic acid anhydride, benzenesulfonic acid chloride, benzenesulfonic acid, trimethylsilyltrifluoromethane sulfonate, the reaction product of benzenesulfonic acid with epoxides, and mixtures thereof.

In a preferred embodiment, the process for preparing the high-temperature resistant foams according to the invention is effected by (i) the reaction of
a) at least one aromatic polyisocyanate in the presence of
c1) a tertiary amine as a catalyst to form an intermediate containing isocyanurate groups; and (ii) quenching the reaction under step (i) at a conversion rate of at most 60% of the isocyanate groups of isocyanate a) by the addition of an amount that is at least equivalent to the amount of amine e1) of
d) a stabilizer selected from the group consisting of organic sulfonic acid esters, methyl iodide, dimethyl sulfate, benzenesulfonic acid anhydride, benzenesulfonic acid chloride, benzenesulfonic acid, trimethylsilyl-trifluoromethane sulfonate, the reaction product of benzenesulfonic acid with epoxides, and mixtures thereof; and (iii) mixing the product obtained under (ii) with
b) at least one aromatic compound having at least two epoxy groups in an amount that corresponds to an equivalent ratio of initially employed isocyanate groups to epoxy groups of from 1.2:1 to 500:1, e) optionally in the presence of auxiliary agents and/or additives, wherein said mixture obtained under (iii) is converted to the foamed state under foaming by (iv) the addition of a blowing agent f), which includes at least one carboxylic acid selected from formic acid and acetic acid, or consists of water and optionally one or more compounds selected from the group containing hydrocarbons, fluorocarbons, and fluorohydrocarbons;

and at least one phosphate e1) that is liquid at 60° C. and under 1 bar;

and a catalyst accelerating the isocyanate/epoxide reaction c2).

In a particular embodiment, the process for preparing the high-temperature resistant foams according to the invention is effected by (i) mixing of
a) at least one aromatic polyisocyanate, and
b) at least one aromatic compound having at least two epoxy groups in an amount that corresponds to an equivalent ratio of isocyanate groups to epoxy groups of from 1.2:1 to 500:1,
(ii) reacting the mixture by adding
c1) a tertiary amine as a catalyst to form an intermediate product; and
(iii) quenching the reaction at a conversion rate of at most 60% of the isocyanate groups of isocyanate a) by the addition of an amount that is at least equivalent to the amount of amine c) of
d) a stabilizer selected from the group consisting of organic sulfonic acid esters, methyl iodide, dimethyl sulfate, benzenesulfonic acid anhydride, benzenesulfonic acid chloride, benzenesulfonic acid, trimethylsilyl-trifluoromethane sulfonate, the reaction product of benzenesulfonic acid with epoxides, and mixtures thereof, to obtain an intermediate stable B state of the viscosity range of from 1500 to 20,000 mPa·s at 25° C.;
e) optionally in the presence of auxiliary agents and/or additives, wherein said mixture obtained under (iii) is converted to the foamed state under foaming by (iv) the addition of a blowing agent f), which includes at least one carboxylic acid selected from formic acid and acetic acid, or consists of water and optionally one or more compounds selected from the group containing hydrocarbons, fluorocarbons, and fluorohydrocarbons;

and at least one phosphate e1) that is liquid at 60° C. and under 1 bar;

and a catalyst accelerating the isocyanate/epoxide reaction c2).

More preferably, formic acid is employed as the sole blowing agent, or a mixture of formic acid and water, preferably of at least 60% by weight of formic acid and at most 40% by weight of water, more preferably of at least 80% by weight of formic acid and at most 20% by weight of water, is employed.

After the foaming into the foamed state, a subsequent temperature treatment at from 70 to 250° C. may preferably be performed.

The invention further relates to the use of the high-temperature resistant foams according to the invention, optionally after annealing, as filling foams for hollow spaces, as filling foams for electric insulation, as a core of sandwich constructions, for the preparation of construction materials for all kinds of interior and exterior applications, for the preparation of construction materials for vehicle, ship, airplane and rocket construction, for the preparation of airplane interior and exterior construction parts, for the preparation of all kinds of insulation materials, for the preparation of insulation plates, tube and container insulations, for the preparation of sound-absorbing materials, for use in engine compartments, for the preparation of grinding wheels, and for the preparation of high-temperature insulations and hardly flammable insulations.

The invention further relates to the use of the foamable mixtures before the foaming into the high-temperature resistant foam according to the invention is complete for adhesively bonding substrates, for adhesively bonding steel, aluminum and copper plates, plastic sheets, and polybutylene terephthalate sheets.

The invention further relates to hollow spaces, electric insulations, cores of sandwich constructions, sandwich constructions, construction materials for all kinds of interior and exterior applications, construction materials for vehicle, ship, airplane and rocket construction, airplane interior and exterior construction parts, all kinds of insulation materials, insulation plates, tube and container insulations, sound-absorbing materials, damping and insulation materials in engine compartments, grinding wheels, high-temperature insulations, and hardly flammable insulations, characterized by containing or consisting of the high-temperature resistant foams according to the invention.

The invention further relates to bondings between substrates, e.g., aluminum, steel and copper plates, plastic sheets, e.g., polybutylene terephthalate sheets, characterized by containing or consisting of the high-temperature resistant foams according to the invention.

The isocyanate component a) is any aromatic polyisocyanates of the kind as per se known from polyurethane chemistry. For example, polyisocyanates as described, for example, by W. Siefken in Justus Liebigs Annalen der Chemie, 562, pages 75 to 136, are suitable, for example, those of formula

in which
n=2-4, preferably 2,
and
Q represents an aromatic hydrocarbyl radical with 6-15, preferably 6-13, carbon atoms, or an araliphatic hydrocarbyl radical with 8-15, preferably 8-13, carbon atoms, e.g., 1,3- and 1,4-phenylenediisocyanate, 2,4- and 2,6-toluenediisocyanate, and any mixtures of these isomers, diphenylmethane-2,4- and/or -4,4'-diisocyanate, naphthylene-1,5-diisocyanate.

Further, there may be used according to the invention, for example: triphenylmethane-4,4',4"-triisocyanate, polyphenyl polymethylene polyisocyanates as obtained by aniline-formaldehyde condensation followed by phosgenation (GB 874 430 and GB 848 671), m- and p-isocyanatophenylsulfonylisocyanates (U.S. Pat. No. 3,454,606), perchlorinated arylpolyisocyanates, (U.S. Pat. No. 3,277,138), polyisocyanates having carbodiimide groups (U.S. Pat. No. 3,152,162), polyisocyanates having allophanate groups, (GB 994 890), polyisocyanates having isocyanurate groups, (U.S. Pat. No. 3,001,973), polyisocyanates having urethane groups (U.S. Pat. Nos. 3,394,164 and 3,644,457), acylated polyisocyanates having urea groups (DE-PS 1 230 778), polyisocyanates having biuret groups, (U.S. Pat. Nos. 3,124,605, 3,201,372 and 3,124,605), polyisocyanates prepared by telomerization reactions (U.S. Pat. No. 3,654,106), polyisocyanates having ester groups (U.S. Pat. No. 3,567,763), reaction products of the above mentioned isocyanates with acetals (DE-PS 1 072 385) and polyisocyanates containing polymeric fatty acid esters (U.S. Pat. No. 3,455,883).

It is also possible to employ the distillation residues having isocyanate groups as obtained in technical isocyanate production, optionally dissolved in one or more of the above mentioned polyisocyanates. Further, it is possible to use any mixtures of the above mentioned polyisocyanates.

Usually preferred are the technically readily accessible polyisocyanates, 2,4- and 2,6-toluenediisocyanate, and any mixtures of these isomers ("TDI"), especially polyphenyl polymethylene polyisocyanates as prepared by aniline-formaldehyde condensation followed by phosgenation ("raw MDI") and polyisocyanates having carbodiimide groups, urethane groups, allophanate groups, isocyanurate groups, urea groups or biuret groups ("modified polyisocyanates"), especially those modified polyisocyanates that are derived from 2,4- and/or 2,6-toluenediisocyanate or from 4,4'- and/or 2,4'-diphenylmethanediisocyanate.

Particularly preferred is the use of a mixture of isomers and/or homologues of polyisocyanates of the diphenylmethane series with a content of 2,4'-diisocyanatodiphenylmethane of more than 20% by weight.

These are mixtures of polyisocyanates of the diphenylmethane series with a content of 2,4'-diisocyanatodiphenylmethane of more than 20% by weight, preferably from 30 to 70% by weight. In addition to this 2,4'-isomer, the particularly preferred polyisocyanate component contains further isomeric or homologous polyisocyanates of the diphenylmethane series. This means that said particularly preferred polyisocyanate component is generally mixtures of 2,4'-diisocyanatodiphenylmethane with 4,4'-diisocyanatodiphenylmethane and optionally from 0 to 20% by weight, based on the total mixture, of 2,2'-diisocyanatodiphenylmethane, or else mixtures of these isomers with higher nuclear polyphenyl polymethylene polyisocyanates. In the latter mixtures, there is generally a content of from 10 up to 60% by weight, based on the total mixture, of such higher nuclear polyisocyanates. For example, the first mentioned diisocyanate mixture enriched with 2,4'-isomers, which is suitable as a polyisocyanate component to be preferably employed, may be obtained by distilling off a diisocyanate mixture of the stated composition from a polyisocyanate mixture as formed by the phosgenation of aniline-formaldehyde condensates. The mixture containing higher nuclear polyisocyanates, which is also particularly suitable, may be obtained, for example, by mixing back the latter mentioned distillation product with the phosgenation product depleted in 4,4'-diisocyanatodiphenylmethane, for example, according to DE-AS 1 923 214. It is also possible to obtain such a mixture, i.e., a polyisocyanate mixture whose content of 2,4'-diisocyanatodiphenylmethane meets the stated values, directly by correspondingly controlling the aniline/formaldehyde condensation. For example, the U.S. Pat. No. 3,277,173 describes a method for obtaining polyamine mixtures of the diphenylmethane series having a high content of 2,4'-diaminodiphenylmethane. The polyisocyanates that can be more preferably employed can then be obtained by the phosgenation of these condensates rich in 2,4'-diaminodiphenylmethane. DE-OS 1 937 685 and the U.S. Pat. No. 3,362,979 also show methods for obtaining such polyisocyanate mixtures. In the particularly suitable polyisocyanate mixtures, which contain higher nuclear polyisocyanates of the diphenylmethane series, the content of 2,4'-diisocyanatodiphenylmethane is also above 20% by weight, based on the total mixture.

Component b), which contains epoxy groups, is any aromatic compounds having at least two epoxy groups. The preferred epoxides that are suitable as component b) have 2 to 4, preferably 2, epoxy groups per molecule, and an epoxy equivalent weight of from 90 to 500 g/eq, preferably from 170 to 220 g/eq.

Suitable polyepoxides include, for example, polyglycidyl ethers of polyvalent phenols, for example, of pyrocatechol, resorcinol, hydroquinone, 4,4'-dihydroxydiphenylpropane (bisphenol A), of 4,4'-dihydroxy-3,3'-dimethyldiphenylmethane, of 4,4'-dihydroxydiphenylmethane (bisphenol F), 4,4'-dihydroxydiphenylcyclohexane, of 4,4'-dihydroxy-3,3'-dimethyldiphenylpropane, of 4,4'-dihydroxydiphenyl, from 4,4'-dihydroxydiphenylsulfone (bisphenol S), of tris(4-hydroxyphenyl)methane, the chlorination and bromination products of the above mentioned diphenols, of novolacs (i.e., from reaction products of mono- or polyvalent phenols with aldehydes, especially formaldehyde, in the presence of acidic catalysts), of diphenols obtained by the esterification of 2 mole of the sodium salt of an aromatic oxycarboxylic acid with one mole of a dihaloalkane or dihalodialkyl ester (cf. British Patent 1 017 612) or of polyphenols obtained by the condensation of phenols and long-chained haloparaffins containing at least two halogen atoms (cf. GB-PS 1 024 288). Further, there may be mentioned: Polyepoxy compounds based on aromatic amines and epichlorohydrin, e.g., N-di(2,3-epoxypropyl)aniline, N,N'-dimethyl-N,N'-diepoxypropyl-4,4'-diaminodiphenylmethane, N,N-diepoxypropyl-4-aminophenyl glycidyl ether (cf. GB-PS 772 830 and 816 923).

In particular, one or more compounds selected from the group consisting of the polyglycidyl ethers of bisphenol A, the polyglycidyl ethers of bisphenol F, novolacs and polyepoxy compounds based on aromatic amines are employed as component b).

The following polyepoxy compounds or mixtures thereof are preferably used as component b).

Polyglycidyl ethers of polyvalent phenols, especially of bisphenol A (Ruetapox® 0162, Bakelite AG; Epikote® Resin 162, Hexion Specialty Chemicals GmbH; Eurepox 710, Brenntag GmbH) and bisphenol F polyepoxy compounds based on aromatic amines, especially bis(N-epoxypropyl)aniline, N,N'-dimethyl-N,N'-diepoxypropyl-4,4'-diaminodiphenylmethane and N,N-diepoxypropyl-4-aminophenylglycidylether.

It is particularly preferred that the polyepoxy compound b) is free of halogen,

Component b) is employed in an amount that corresponds to an equivalent ratio of isocyanate groups to epoxy groups of from 1.2:1 to 500:1, preferably from 3:1 to 65:1, especially from 3:1 to 30:1, more preferably from 3:1 to 10:1, even more preferably from 4:1 to 7:1.

Catalyst component c) includes the catalyst components c1) and c2). These are any mono- or polyfunctional organic amines with tertiary amino groups. Suitable amines of the kind mentioned generally have a molecular weight of up to 353, preferably from 101 to 185. Preferred are those tertiary amines that are liquid at the reaction temperature of the first reaction stage. Typical examples of suitable amines include triethylamine, tri-n-butylamine, dimethylcyclohexylamine, N,N,N',N'-tetramethylethylenediamine, N,N-dimethylbenzylamine, triethylenediamine or dimethyloctylamine, N-methylmorpholine and bis(N,N-dimethylaminoethyl) ether, of which N,N-dimethylbenzylamine is preferred.

According to the invention, any mixtures of these mentioned amine compounds as well as pentamethyldiethylene triamine, N-methyl-W-dimethylaminoethylpiperazine, N,N-diethylethanolamine and silamorpholine can be preferably employed as catalysts c) in addition to the tertiary amines described.

The suitable amines also include those that have a blowing effect in addition to the catalyst effect. In this case, the catalyst component c) also acts as a blowing agent at the same time.

In particular, N,N-dimethylbenzylamine, methyl-N,N-dibenzylamine, boron trichloride tert. amine adducts, and N-[3-(dimethylamino)propyl]formamide are preferred as catalysts c).

The catalysts (c) are employed in an amount of from 0.01 to 4%, preferably 0.01 to 2%, by weight, based on the total weight of components (a) and (b).

The stabilizers d) (also referred to as "stoppers") are so-called catalyst poisons for the catalysts c). Suitable are any esters of organic sulfonic acids having an alkylating effect. Preferably, such sulfonic acid alkyl esters have a molecular weight of from 110 to 250 g/mol. Both aliphatic sulfonic acid alkyl esters, such as n-butanesulfonic acid methyl ester, n-perfluorobutane sulfonic acid methyl ester or n-hexanesulfonic acid ethyl ester, and aromatic sulfonic acid alkyl esters, such as benzenesulfonic acid methyl ester, ethyl ester or n-butyl ester, p-toluenesulfonic acid methyl ester, ethyl ester or n-butyl ester, 1-naphthalenesulfonic acid methyl ester, 3-nitrobenzenesulfonic acid methyl ester or 2-naphthalenesulfonic acid methyl ester, are suitable. The mentioned aromatic sulfonic acid esters are preferred. More preferably, p-toluenesulfonic acid methyl ester is used as component d). Also suitable, but less preferred, are methyl iodide and dimethyl sulfate as component d), also benzenesulfonic anhydride, benzenesulfonic chloride, benzenesulfonic acid, trimethylsilyltrifluoromethanesulfonate, and the reaction product of benzenesulfonic acid with epoxides, preferably phenoxypropyleneoxide.

Component d) is used in at least an amount that is equivalent to the tertiary amine nitrogen atoms of component c1).

In addition to said at least one carboxylic acid selected from formic acid and acetic acid, water and/or phospholine oxide may be used as a blowing agent f).

Hydrocarbons, such as pentane, butane, hexane, fluorocarbons or fluorohydrocarbons, are employed as physical blowing agents.

Preferably, the blowing agents f) contain at least one carboxylic acid selected from formic acid and acetic acid, and more preferably, the blowing agents f) contain formic acid.

In a particularly preferred embodiment, formic acid is the sole blowing agent.

In another particularly preferred embodiment, the blowing agent consists of a mixture of formic acid and water, preferably of at least 60% by weight formic acid and at most 40% by weight water, more preferably of at least 80% by weight formic acid and at most 20% by weight water.

The phosphate e1) to be added according to the invention has a liquid state of matter at 60° C. and under 1 bar.

Preferably, the phosphate is one or more organic compounds selected from the group consisting of tributyl phosphate, triethyl phosphate, triphenyl phosphate, all isomers of diphenyl cresyl phosphate, o,o,o-tricresyl phosphate, m,m,m-tricresyl phosphate, tris(2-chloropropyl) phosphate, diphenyl 2-ethylhexyl phosphate, dimethyl propyl phosphate, and diethyl bis(2-hydroxyethyl)aminomethyl phosphate.

More preferably employed are phosphates selected from the group consisting of tributyl, triethyl or triphenyl phosphate, all isomers of diphenyl cresyl phosphate, m,m,m- and o,o,o-tricresyl phosphates, tris(2-chloropropyl) phosphate, diphenyl 2-ethylhexyl phosphate, dimethyl propyl phosphate, and diethyl bis(2-hydroxyethyl)aminomethyl phosphate.

Even more preferably employed are tributyl, triethyl or triphenyl phosphate, all isomers of diphenyl cresyl phosphate, m,m,m- and o,o,o-tricresyl phosphates, and/or tris(2-chloropropyl) phosphate.

The phosphates e1) are employed in an amount of from 0.5 to 50%, preferably 1 to 40%, by weight, more preferably from 3 to 25% by weight, based on the total weight of components (a) and (b).

Further preferred auxiliary agents and additives e) include the known foam stabilizers of the polyethersiloxane type, mold-release agents, e.g., polyamide waxes and/or stearic acid derivatives, and/or natural waxes, e.g., carnauba wax.

As further auxiliary agents and additives e), there may be employed, for example, multifunctional compounds containing hydroxy or amino groups e2), which include e2-i) compounds having at least 2, especially from 2 to 8, and preferably from 2 to 3, alcoholic hydroxy groups and a molecular weight of from 62 to 8000 g/mol. Such compounds are per se known as structural components of polyurethane, and include low molecular weight chain extenders and polyols with number average molecular weights of more than 200 g/mol. Examples of chain extenders include simple polyhydric alcohols, such as ethylene glycol, hexanediol-1,6, glycerol or trimethylolpropane, examples of polyols include polyols having dimethylsiloxane moieties, for example, bis(dimethylhydroxymethylsilyl) ether; polyhydroxy compounds having ester groups, such as castor oil or polyhydroxy polyester, as accessible by the polycondensation of superfluous amounts of simple polyvalent alcohols of the kind just mentioned in an exemplary way with, preferably dibasic, carboxylic acids or anhydrides thereof, such as adipic acid, phthalic acid, or phthalic anhydride, polyhydroxy polyethers as accessible by an addition reaction of alkylene oxides, such as propylene oxide and/or ethylene oxide with suitable starter molecules, such as water, the simple alcohols just mentioned above, or even amines having at least two aminic NH linkages, or polycarbonate polyols, which may be obtained, for example, from polyhydric alcohols and carbonates or phosgene.

In addition, the compounds e2) may also be e2-ii) compounds with at least two isocyanate-reactive hydrogen atoms, of which at least one belongs to a primary or secondary amino group. These include polyetheramines and compounds with molecular weights of less than 500 g/mol and two amino groups. Polyetheramines are known from polyurethane chemistry and can be obtained by terminal amination of polyether polyols. These preferably have molecular weights of from 500 to 8000 g/mol. The preferably used compounds with two amino groups and having molecular weights of smaller than 500 g/mol more preferably have a molecular weight of 58 to 300 g/mol, especially from 100 to 200 g/mol. These compounds preferably have two primary amino groups as said isocyanate-reactive groups. In a particularly preferred embodiment, the primary amino groups are linked to aromatic hydrocarbons, preferably to an aromatic six-ring, especially in meta- or para-position. In particular, diethylenetoluenediamine (DETDA), especially DETDA 80, is employed as said compounds e2-ii). Diethylenetoluenediamine is commercially available, for example, from Lonza or Albemarle.

If compounds with two amino groups and molecular weights of less than 500 g/mol are employed, it is preferably done in amounts of from 0.1 to 5, more preferably from 0.5 to 2% by weight, based on the total weight of compounds (a) and (b).

If any, the additives e2) are included in a maximum amount that corresponds to an NCO/OH equivalent ratio of at least 2:1, preferably at least 7:1, and especially at least 10:1, based on the isocyanate groups of component a) and the hydroxy groups and/or amino groups of component e2). At any rate, the amount of component a) must be such that the equivalent ratio of isocyanate groups of component a) to the sum of the epoxy groups of component b), hydroxy groups and/or amino groups of component e2) and the hydroxy groups that may be present in component b) is at least 1.2:1, preferably from 3:1 to 65:1, especially from 3:1 to 30:1, more preferably from 3:1 to 15:1.

The ratio of the weight of all compounds containing hydroxy and/or urea groups from component e2), preferably of polyols and polyetheramines, to the weight of epoxy component b) is preferably smaller than 30:70, preferably it is at most 28:72, more preferably at most 25:75, and even more preferably from 0-20:80-100.

The EPIC foam according to the invention preferably contains urethane groups and/or urea groups derived from the reaction of the polyisocyanate a) with component (e) at a small weight proportion. The content of urethane groups and/or urea groups resulting from the reaction of polyisocyanate a) with the hydroxy and/or amine groups from component e) is preferably below 6% by weight, preferably below 5% by weight, more preferably below 4% by weight, and even more preferably below 3% by weight, based on the total weight of the components.

In a particularly preferred embodiment, the EPIC foam has a content of urethane groups and/or urea groups resulting from the reaction of the polyisocyanate a) with the hydroxy and/or amino groups from component e) that is ≥0.01 to ≤1.0% by weight, preferably ≥0.01 to <0.8% by weight, based on the total weight of the components.

In one embodiment, the EPIC foam does not contain any urethane groups and/or urea groups resulting from the reaction of the polyisocyanate a) with component e).

Preferably, the reaction mixture contains less than 28% by weight, more preferably less than 25% by weight, of compounds containing hydroxy groups and/or amino groups of component e2), based on the total weight of components b) and e2), and the EPIC foam contains less than 6% by weight, preferably less than 5% by weight, even more preferably ≥0.01 to ≤1% by weight, especially preferably 0.01 to <0.8% by weight, based on the total weight of the components, of urethane and/or urea groups derived from the reaction of polyisocyanate a) with component e), based on the total weight of the foam.

More preferably, the reaction mixture contains less than 28% by weight, preferably less than 25% by weight, of polyols and/or polyether amines, based on the total weight of components b) and polyols and/or polyetheramines, and the EPIC foam contains less than 6% by weight, preferably less than 5% by weight, even more preferably ≥0.01 to ≤1% by weight, especially preferably 0.01 to <0.8% by weight, based on the total weight of the components, of urethane and/or urea groups derived from the reaction of polyisocyanate a) with component e), based on the total weight of the foam.

Further auxiliary agents and additives e) that may optionally be included are e3) polymerizable olefinically unsaturated monomers, which may be employed in amounts of up to 100% by weight, preferably up to 50% by weight, especially up to 30% by weight, based on the total weight of components a) and b).

Typical examples of additives e3) include olefinically unsaturated monomers having no hydrogen atoms that are reactive towards NCO groups, such as diisobutylene, styrene, $C_1$-$C_4$-alkylstyrenes, such as α-methylstyrene, α-butylstyrene, vinyl chloride, vinyl acetate, maleic imide derivatives, such as bis(4-maleinimidophenyl)methane, acrylic acid $C_1$-$C_8$-alkyl ester, such as acrylic acid methyl ester, acrylic acid butyl ester, or acrylic acid octyl ester, the corresponding methacrylic acid esters, acrylonitrile, or diallyl phthalate. Any mixtures of such olefinically unsaturated monomers may also be employed. Preferably, styrene and/or (meth)acrylic acid $C_1$-$C_4$-alkyl ester is used, provided that the additives e3) are employed at all.

If additives e3) are included, the inclusion of classical polymerization initiators, such as benzoyl peroxide, is possible, but generally not required.

The inclusion of auxiliary agents and additives e2) or e3) is generally not required. Incidentally, the additives mentioned by way of example under e2) are preferred over the compounds mentioned by way of example under e3). In principle, it is also possible to include both kinds of auxiliary agents and additives at the same time. However, to optimize the mechanical data of the EPIC foams, the addition of a low proportion of auxiliary agents and additives e2) or e3) may be advantageous, but wherein too large a proportion may in turn have a negative influence.

Further auxiliary agents and additives e) that may optionally be included are, for example, e4) fillers, such as quartz flour, chalk, microdol, alumina, silicon carbide, graphite or corundum; pigments such as titanium dioxide, iron oxide or organic pigments, such as phthalocyanine pigments; plasticizers, such as dioctyl phthalate; compatibilizers that can be incorporated, such as methacrylic acid, β-hydroxypropyl ester, maleic acid and fumaric acid esters; substances improving flame retardancy, such as red phosphorus or magnesium oxide; soluble dyes or reinforcing materials, such as glass fibers or glass tissues. Also suitable are carbon fibers or carbon fiber tissues, and other organic Polymer fibers, such as aramide fibers or LC polymer fibers (LC="Liquid Crystal"). Further, metallic fillers may be considered as fillers, such as aluminum, copper, iron and/or steel. In particular, the metallic fillers are employed in a granular form and/or in powder form.

Further auxiliary agents and additives e) that may optionally be included are, for example, e5) olefinically unsaturated monomers with hydrogen atoms that are reactive towards NCO groups, such as hydroxyethyl methacrylate, hydroxypropyl methacrylate, and aminoethyl methacrylate.

The auxiliary agents and additives e) may be either incorporated in the starting materials a) and b) before the process according to the invention is performed, or admixed with them later.

For performing the process according to the invention, the starting materials a) and b) can be mixed with one another. Then, the phosphate e1), optionally further auxiliary agents and additives e), the catalyst c) and blowing agent f) are added to the reaction mixture, all is thoroughly mixed, and the foamable mixture is cast into an open or closed mold.

When a multicomponent mixing head as known from polyurethane processing is used, the process is characterized by a high flexibility. By varying the mixing ratio of components a) and b), different foam qualities can be prepared with identical starting materials. In addition, different components a) and different components b) may also be supplied to the mixing head at different ratios. The phosphate e1), the auxiliary agents and additives e), the catalyst c) and the blowing agents f) may be supplied to the mixing head separately or as a batch. It is also possible to meter the phosphate e1) and optionally further auxiliary agents and additives e) together with the catalyst c), and to separately meter the blowing agents f).

Foams with different bulk density ranges can be prepared by varying the amount of blowing agent f).

In a specific embodiment of the process according to the invention, a stable reaction mixture is obtained by adding a stabilizer d) during the mixing of starting materials a) and b), phosphate e1), and optionally the further auxiliary agents and additives e), or part thereof. This mixture may be supplied to the second stage of the process according to the invention, optionally after any time of intermediate storage. Thus, optionally further auxiliary agents and additives e), the catalyst c) and the blowing agents f) are added to said stable reaction mixture, all is thoroughly mixed, and the foamable mixture is cast into an open or closed mold.

This process is particularly advantageous if the mixing ratio of components a) and b) is not to be varied. No separate storage containers, metering means and mixing head feeds for components a) and b) are necessary.

In another specific embodiment of the process according to the invention, the starting materials a) and a catalyst c1), optionally the phosphate e1) or part thereof, and optionally further auxiliary agents and additives e), or part thereof, may be mixed with one another and caused to react within a temperature range of from 20 to 150° C., preferably from 60 to 130° C. After a conversion rate of at most 60%, preferably from 15 to 30%, of the isocyanate groups introduced by component a), the reaction is quenched by adding the stabilizer/stopper d). The thus obtained stable intermediate product may be mixed with component b), optionally after any time of intermediate storage, to obtain a B state, which is liquid at room temperature. Optionally after any time of intermediate storage, the latter may be supplied to the second stage of the process according to the invention. Thus, the residual amount of phosphate e1) and optionally further auxiliary agents and additives e), more catalyst c2), and the blowing agent f) are added to said B state, all is thoroughly mixed, and the foamable mixture is cast into an open or closed mold.

This process has the advantage of a higher viscosity B stage at the beginning of the foaming reaction. Depending on whether, and if so which, auxiliary agents and additives e) are added, a higher viscosity B stage results in improved mechanical foam properties. The subsequent mixing of said stable, partially reacted component a) with component b) offers the advantage of a high flexibility, since different components b) can be mixed with the partially reacted component a) to form different stable B states, as needed.

In another specific embodiment of the process according to the invention, the starting materials a) to c1), optionally the phosphate e1) or part thereof, and optionally further auxiliary agents and additives e), or part thereof, may be mixed with one another and caused to react within a temperature range of from 20 to 150° C., preferably from 60 to 130° C. After a conversion rate of at most 60%, preferably from 15 to 30%, of the isocyanate groups introduced by component a), the reaction is quenched by adding the stabilizer/stopper d). The thus obtained intermediate product represents a liquid B state at room temperature and can be supplied to the second stage of the process according to the invention, optionally after any time of intermediate storage. Thus, the residual phosphate e1) or part thereof and optionally further auxiliary agents and additives e), more catalyst c2), and the blowing agent f) are added to said intermediate product (B state), all is thoroughly mixed, and the foamable mixture is cast into an open or closed mold.

This process also has the advantage of a higher viscosity B stage at the beginning of the foaming reaction. If component b) is not to be varied, this process is to be preferred over that described above in certain cases. The usually low viscosity components a) and b) can be readily mixed to prepare the higher viscosity B state therefrom. In contrast, the partially reacted component a) may have a relatively high viscosity depending on its nature and the rate of conversion, which renders both the process control in the partial reaction and the subsequent mixing with component b) more difficult.

In the above described embodiments, the phosphate e1) may be added either to the starting materials a), b) or e), or directly to the B state. The addition to the B state is preferred.

Depending on the components employed, the blowing process generally starts after a waiting time of 10 s to 6 min and is usually completed after 2-12 min. The foams are fine-celled and uniform.

In order to achieve optimum properties, it is advantageous to perform a subsequent temperature treatment after the foaming to the final foamed state.

In a preferred embodiment, a subsequent temperature treatment at from 70 to 250° C., preferably from 120 to 250° C., more preferably from 180 to 220° C., is performed after the foaming to the final foamed state.

When a closed mold is used for preparing the foams according to the invention (mold foaming), it may be advantageous to overfill the mold in order to achieve optimum properties. "Overfilling" means that an amount of foamable mixture is filled in that would occupy a larger volume than the inner volume of the mold amounts to in an open mold after the foaming is complete.

The foams according to the invention are hardly flammable and have low dielectric losses, the moisture resistance and abrasion resistance as well as the processability in molds are excellent.

The foams according to the invention have <10% by weight carbodiimide structures, preferably less than 8% by weight, even more preferably less than 5% by weight, based on the total weight of the foam. The determination of the weight proportion of the carbodiimide structures may be effected either by calculation or by ATR-FTIR spectroscopy.

The invention will be further explained by means of the following Examples.

EXAMPLES

The dynamic viscosities were determined at 25° C. with a rotary viscometer (Rheoplus 32) at a shear rate of 120 s$^{-1}$ (DIN 53019).

The measurement of the bulk densities was effected according to DIN 53 420 on foam cubes (5 cm×5 cm×5 cm) that were cut from the middle of the foams.

The measurement of the compressive strengths was effected according to DIN EN 826 on foam cubes (5 cm×5 cm×5 cm) that were cut from the middle of the foams.

The measurement of the maximum average rate of heat emission (MARHE) was effected according to ISO 5660-1. The measurement of the total smoke production per occupied surface (TSP) was effected according to ISO 5660-2. All tests were performed with a radiant heat flux density of 50 kW/m² on test specimens having dimensions of 100 mm×100 mm×20 mm.

The flammability and flame spread were determined according to the requirements of building material class B2 according to DIN 4102-1.

The NCO conversion in the foam was measured by ATR-FTIR on a disk cut from the middle of the foams (disk of 2 cm×10 cm×0.5 cm). The following process was applied:

The determination of the NCO conversion by infrared spectroscopy was effected with the Fourier-transform infrared spectrometer VERTEX 70 from the company Bruker, which is equipped with the ATR (attenuated total reflection) measuring unit MIRacle from the company Pike.

The foam samples to be examined were prepared and pressed onto the ZnSe ATR crystal (diameter 3 mm) of the MIRacle measuring unit by means of a ratchet mechanism. For each spectrum, 32 scans were recorded at a spectral resolution of 4 cm⁻¹, and averaged. ATR absorbance spectra were evaluated with elimination of oblique or curved baselines with the elastic band method.

The determination of the spectroscopic NCO conversion was effected by means of the NCO band at 2270 cm⁻¹, which is relatively isolated spectrally. The portion of the peak area between 2200 and 2320 cm⁻¹ ($A_{NCO}$) that is not overlapped by other bands and is approximately proportional to the concentration of the NCO groups ($C_{NCO}$) in the analyzed foam range is evaluated.

With the corresponding NCO peak area ($A_{NCO,0}$) at the beginning of the foaming reaction that resulted in the examined foam and is approximately proportional to the initial NCO concentration ($C_{NCO,0}$), the spectroscopic NCO conversion at the time of the analysis can be determined:

NCO conversion [%]=100×(1−$c_{NCO}/c_{NCO,0}$)≈100× (1−$A_{NCO}/A_{NCO,0}$).

Since $A_{NCO,0}$ usually cannot be measured directly, this parameter is calculated from the raw material spectra recorded in advance, taking into account the respective mass proportions in the formulation, the densities of the raw materials and refractive indices (synthetic spectrum).

For mixing series of isocyanate with non-reactive raw materials, it was shown that the calculated NCO peak areas of the related synthetic mixture spectra agree well with the measured NCO peak areas, so that $A_{NCO,0}$ can be reasonably calculated from the synthetic mixture spectrum of the foam formulation.

Materials Employed:

Isocyanate

MDI-1: Desmodur 85/25, isocyanate based on diisocyanatodiphenylmethane with an NCO content of 32.5% by weight and a viscosity of 20 mPa·s (DIN EN ISO 11909), containing at least 85% monomeric MDI Phosphate Disflamol DPK: (diphenyl cresyl phosphate), trade name, obtainable from Lanxess, Germany, viscosity at 20° C.: 44-49 mPa·s, clear colorless liquid Disflamol TKP: (tricresyl phosphate), trade name, obtainable from Lanxess, Deutschland, viscosity at 20° C.: 70-80 mPa·s, clear colorless liquid Trade name Levagard TCPP (tris(2-chloropropyl) phosphate), obtainable from Lanxess, Germany, viscosity at 20° C.: <100 mPa·s, clear colorless liquid Additive 1:

25% by weight polyether polysiloxane (Tegostab B8411, Evonik), 62.5% by weight polyetherpolyol (OH number 56 mg KOH/g, functionality 2, prepared by the propoxylation of propylene glycol), and 12.5% by weight N-(3-dimethylaminopropylformamide)

Blowing Agent

Blowing agent 1: formic acid (98-100% by weight), CAS No. 64-18-6, obtainable from KMF Laborchemie, Lohmar/Germany Blowing agent 2: Solkane 365/227 (liquid fluorohydrocarbon as a blowing agent for foams, mixture of pentafluorobutane (87% by weight) with heptafluoropropane (13% by weight), obtainable from Solvay Fluor GmbH, Hannover, Germany Epoxide:

BADGE1: Ruetapox 0162, diglycidyl ether of bisphenol A, commercial product from Bakelite AG; Duisburg/Germany, epoxide index: 5.8-6.1 eq/kg and an epoxy equivalent of 167-171 g/eq, viscosity at 25° C.: 4000-5000 mPas A) Preparation of the EPIC Resin A At 95° C., 8000 g of MDI-1 was admixed with 2000 g of EPOXIDE. Subsequently, 1.6 ml of dimethylbenzylamine was added and mixed with stirring. The slightly exothermic reaction indicated the immediate start of the isocyanurate formation.

After a reaction time of 2 hours, a sample was removed from the charge. The sample had an NCO content of 21.5% by weight. The reaction was quenched by adding 40 g of p-toluenesulfonic acid methyl ester. Thereafter, the charge was stirred for another 30 min at 95 to 80° C.

The product had a viscosity at 25° C. of 3900 mPa·s (DIN 53019) and an NCO content of 21.0% by weight NCO (DIN EN ISO 11909:2007).

B) General Description of the Preparation of Foams 1 to 4 from Table 1:

For preparing the foams according to the invention, the EPIC resin from A) and the PHOSPHATE (see Table 1) were loaded with air by means of a quick stirrer for 2 minutes. With further stirring, first the ADDITIVE 1 and then the BLOWING AGENT were added, and the reaction mixture was thoroughly mixed for another 10 s. The reaction mixture was cast into a square-shaped paper mold (20 cm×20 cm×14 cm) and allowed to stand for foaming. Subsequently, the foam was annealed at 200° C. for 3 hours.

C) General Description of the Preparation of Foams 5 to 6 from Table 1:

The EPIC resin from Example 1 was loaded with air by means of a quick stirrer for 2 minutes. With further stirring, first the ADDITIVE 1 and then the BLOWING AGENT were added, and the reaction mixture was thoroughly mixed for another 10 s. The reaction mixture was cast into a square-shaped paper mold (20 cm×20 cm×14 cm) and allowed to stand for foaming.

Subsequently, foam 5 was annealed at 200° C. for 3 hours. Foam 6 was not annealed,

TABLE 1

Composition and properties of foams 1-6

| | Foam | 1 | 2 | 3 | 4 | 5 | 6 |
|---|---|---|---|---|---|---|---|
| | EPIC resin A (weight parts) | 400 | 400 | 400 | 400 | 400 | 400 |
| PHOSPHATE | TCPP (weight parts) | 77 | | | | | |
| | DPK (weight parts) | | | 75 | | 75 | |

TABLE 1-continued

Composition and properties of foams 1-6

| Foam | | 1 | 2 | 3 | 4 | 5 | 6 |
|---|---|---|---|---|---|---|---|
| | TKP (weight parts) | | | | 75 | | |
| ADDITIVE-1 | | 28.6 | 27.7 | 28.8 | 27.7 | 27.7 | 27.7 |
| BLOWING AGENT | Blowing agent 1 (weight parts) | 6 | 6 | 6 | | 6 | 6 |
| | Blowing agent 2 (weight parts) | | | | 60 | | |
| Density (kg/m$^3$) | | 44 | 39 | 43 | 31 | 38 | 39 |
| NCO conversion (% by weight) | | 98.7 | 98.5 | 98.5 | 97.7 | 95.8 | 90 |
| Compression strength (kPa) | | 277 | 231 | 255 | 80 | 246 | 306 |
| MARHE (kW/m$^2$) | | 101 | 86 | 92 | 93 | 104 | 129 |

The invention claimed is:

1. A high-temperature resistant foam obtained by a process in which a) an aromatic polyisocyanate is mixed with b) at least one aromatic compound having at least two epoxy groups, c) at least one catalyst accelerating the isocyanate/epoxide reaction, f) chemical and optionally physical blowing agents, and e) auxiliary agents and/or additives, to form a reaction mixture, wherein the equivalent ratio of isocyanate groups to epoxy groups is from 1.2:1 to 500:1, and the reaction mixture is reacted into a foam, wherein
said auxiliary agents and/or additives e) include at least one e1) phosphate liquid at 60° C. and under 1 bar, and
said chemical and/or physical blowing agents f) include at least one carboxylic acid selected from formic acid and acetic acid, or that said blowing agent f) consists of water and optionally one or more compounds selected from the group containing hydrocarbons, fluorocarbons, and fluorohydrocarbons;
and that one or more compounds selected from the group consisting of the polyglycidyl ethers of bisphenol A, the polyglycidyl ethers of bisphenol F, novolacs and polyepoxy compounds based on aromatic amines are employed as component b);
wherein said foam contains <10% by weight of carbodiimide structures.

2. The high-temperature resistant foam according to claim 1, wherein said blowing agents f) include at least one carboxylic acid selected from formic acid and acetic acid.

3. The high-temperature resistant foam according to claim 1, wherein the reaction is effected in the presence of d) a stabilizer selected from the group consisting of organic sulfonic acid esters, methyl iodide, dimethyl sulfate, benzenesulfonic acid anhydride, benzenesulfonic acid chloride, benzenesulfonic acid, trimethylsilyltrifluoromethane sulfonate, the reaction product of benzenesulfonic acid with epoxides, and mixtures thereof.

4. The high-temperature resistant foam according to claim 2, wherein said blowing agents f) consist of formic acid.

5. A process for preparing a high-temperature resistant foam by reacting
a) at least one aromatic polyisocyanate with
b) at least one aromatic compound having at least two epoxy groups in an amount that corresponds to an equivalent ratio of isocyanate groups to epoxy groups of from 1.2:1 to 500:1,
e) in the presence of auxiliary agents and additives, wherein
said auxiliary agents and/or additives e) include at least one e1) phosphate liquid at 60° C. and under 1 bar, and
that the reaction is performed in the presence of chemical and/or physical blowing agents f), which include at least one carboxylic acid selected from formic acid and acetic acid, or consist of water and optionally one or more compounds selected from the group containing hydrocarbons, fluorocarbons, and fluorohydrocarbons,
and a catalyst accelerating the isocyanate/epoxide reaction c) with foaming; and
that one or more compounds selected from the group consisting of the polyglycidyl ethers of bisphenol A, the polyglycidyl ethers of bisphenol F, novolacs and polyepoxy compounds based on aromatic amines are employed as component b); and
the reaction is effected in the presence of d) a stabilizer selected from the group consisting of organic sulfonic acid esters, methyl iodide, dimethyl sulfate, benzenesulfonic acid anhydride, benzenesulfonic acid chloride, benzenesulfonic acid, trimethylsilyltrifluoromethane sulfonate, the reaction product of benzenesulfonic acid with epoxides, and mixtures thereof.

6. The process according to claim 5 comprising
(i) the reaction of
a) at least one aromatic polyisocyanate in the presence of
c) a tertiary amine as a catalyst to form an intermediate containing isocyanurate groups; and
(ii) quenching the reaction under step (i) at a conversion rate of at most 60% of the isocyanate groups of isocyanate a) by the addition of an amount that is at least equivalent to the amount of amine c) of d) a stabilizer selected from the group consisting of organic sulfonic acid esters, methyl iodide, dimethyl sulfate, benzenesulfonic acid anhydride, benzenesulfonic acid chloride, benzenesulfonic acid, trimethylsilyltrifluoromethane sulfonate, the reaction product of benzenesulfonic acid with epoxides, and mixtures thereof; and
(iii) mixing the product obtained under (ii) with
b) at least one aromatic compound having at least two epoxy groups in an amount that corresponds to an equivalent ratio of initially employed isocyanate groups to epoxy groups of from 1.2:1 to 500:1,
e) in the presence of auxiliary agents and/or additives;
wherein the mixture obtained under (iii) is converted to the foamed state under foaming by
(iv) the addition of a blowing agent f), which includes at least one carboxylic acid selected from formic acid and acetic acid, or consists of water and optionally one or more compounds selected from the group containing hydrocarbons, fluorocarbons, and fluorohydrocarbons;
and at least one phosphate e1) that is liquid at 60° C. and under 1 bar;
and a catalyst accelerating the isocyanate/epoxide reaction c2).

7. The process according to claim 5 comprising
(i) mixing of
a) at least one aromatic polyisocyanate, and
b) at least one aromatic compound having at least two epoxy groups in an amount that corresponds to an equivalent ratio of isocyanate groups to epoxy groups of from 1.2:1 to 500:1,
(ii) reacting the mixture by adding
c1) a tertiary amine as a catalyst to form an intermediate product; and
(iii) quenching the reaction at a conversion rate of at most 60% of the isocyanate groups of isocyanate a) by the addition of an amount that is at least equivalent to the amount of amine c) of d) a stabilizer selected from the group consisting of organic sulfonic acid esters, methyl iodide, dimethyl sulfate, benzenesulfonic acid anhydride, benzenesulfonic acid chloride, benzenesulfonic acid, trimethylsilyltrifluoromethane sulfonate, the reaction product of benzenesulfonic acid with epoxides, and mixtures thereof, to obtain an intermediate stable B state of the viscosity range of from 1500 to 20,000 mPa·s at 25° C.;

e) in the presence of auxiliary agents and/or additives;

wherein the mixture obtained under (iii) is converted to the foamed state under foaming by the addition of a blowing agent f), which includes at least one carboxylic acid selected from formic acid and acetic acid, or consists of water and optionally one or more compounds selected from the group containing hydrocarbons, fluorocarbons, and fluorohydrocarbons;

and at least one phosphate e1) that is liquid at 60° C. and under 1 bar;

and a catalyst accelerating the isocyanate/epoxide reaction c2).

8. The process according to claim 5, wherein said blowing agents f) include at least one carboxylic acid selected from formic acid and acetic acid.

9. The process according to claim 5, wherein, after the foaming to the foamed state, a subsequent temperature treatment at from 70 to 250° C. is performed.

10. A method comprising utilizing the high-temperature resistant foam according to claim 1 as a as a filling foam for hollow spaces, as a filling foam for electric insulation, as a core of sandwich constructions, for the preparation of construction materials for all kinds of interior and exterior applications, for the preparation of construction materials for vehicle, ship, airplane and rocket construction, for the preparation of airplane interior and exterior construction parts, for the preparation of all kinds of insulation materials, for the preparation of insulation plates, tube and container insulations, for the preparation of sound-absorbing materials, for use in engine compartments, for the preparation of grinding wheels, and for the preparation of high-temperature insulations and hardly flammable insulations.

11. A method comprising utilizing a foamable mixture before the end of the foaming to form the foam having high temperature resistance according to claim 1 for adhesively bonding substrates, for adhesively bonding steel, aluminum and copper plates, plastic sheets, and polybutylene terephthalate sheets.

12. Hollow spaces, electric insulations, cores of sandwich constructions, sandwich constructions, construction materials for all kinds of interior and exterior applications, construction materials for vehicle, ship, airplane and rocket construction, airplane interior and exterior construction parts, all kinds of insulation materials, insulation plates, tube and container insulations, sound-absorbing materials, damping and insulation materials in engine compartments, grinding wheels, high-temperature insulations, and hardly flammable insulations, comprising the high-temperature resistant foam according to claim 1.

13. Bondings between substrates, bondings between steel and copper plates, plastic sheets and polybutylene terephthalate sheets, comprising the high-temperature resistant foams according to claim 1.

\* \* \* \* \*

UNITED STATES PATENT AND TRADEMARK OFFICE
CERTIFICATE OF CORRECTION

PATENT NO. : 10,526,463 B2
APPLICATION NO. : 15/551748
DATED : January 7, 2020
INVENTOR(S) : Florian Hupka et al.

It is certified that error appears in the above-identified patent and that said Letters Patent is hereby corrected as shown below:

In the Specification

Column 5, Line 19, "2,4-" should read --e.g., 2,4- --

Column 6, Line 47, "(Ruetapox" should read --(Rutapox--

Column 7, Line 8, "W-dimethylaminoethylpiperazine," should read --N'-dimethylaminoethylpiperazine,--

Column 7, Line 17, "tert." should read --tert,--

Column 9, Line 55, "0.01" should read --$\geq$ 0.01--

Column 9, Line 66, "0.01" should read --$\geq$ 0.01--

Column 10, Line 48, "aramide" should read --aramid--

Column 13, Line 59, "Disflamol" should read --Disflamoll--

Column 13, Line 62, "Disflamol" should read --Disflamoll--

Column 14, Line 17, "Ruetapox" should read --Rutapox--

Column 14, Line 20, "mPas" should read --mPa·s--

Column 14, Line 45, "to" should read --and--

Signed and Sealed this
Twenty-third Day of June, 2020

Andrei Iancu
*Director of the United States Patent and Trademark Office*